US010567825B2

(12) United States Patent
Jones et al.

(10) Patent No.: US 10,567,825 B2
(45) Date of Patent: Feb. 18, 2020

(54) CLOUD DVR STORAGE (71) Applicant: TELEFONAKTIEBOLAGET LM ERICSSON (PUBL), Stockholm (SE)

(72) Inventors: Anthony Richard Jones, Southampton (GB); Tomer Amiaz, Raanana (IL)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/756,264

(22) PCT Filed: Dec. 17, 2015

(86) PCT No.: PCT/EP2015/080274
§ 371 (c)(1),
(2) Date: Feb. 28, 2018

(87) PCT Pub. No.: WO2017/036568
PCT Pub. Date: Mar. 9, 2017

(65) Prior Publication Data
US 2018/0270524 A1 Sep. 20, 2018

Related U.S. Application Data (60) Provisional application No. 62/214,559, filed on Sep. 4, 2015.

(51) Int. Cl.
*H04N 21/2747* (2011.01)
*H04N 21/2343* (2011.01)
*H04N 21/235* (2011.01)
*H04N 21/2387* (2011.01)
*H04N 21/2662* (2011.01)

(52) U.S. Cl.
CPC ..... *H04N 21/2747* (2013.01); *H04N 21/2353* (2013.01); *H04N 21/2387* (2013.01); *H04N 21/23439* (2013.01); *H04N 21/2662* (2013.01)

(58) Field of Classification Search
CPC ......... H04N 21/2747; H04N 21/23439; H04N 21/2353; H04N 21/2387; H04N 21/2662
See application file for complete search history.

(56) References Cited

U.S. PATENT DOCUMENTS

| | | | |
|---|---|---|---|
| 6,532,593 B1 * | 3/2003 | Moroney | H04N 5/76 348/E5.007 |
| 8,856,283 B2 * | 10/2014 | Biderman | H04N 5/783 709/219 |
| 9,712,860 B1 * | 7/2017 | Waggoner | H04N 21/2662 |
| 2002/0136538 A1 * | 9/2002 | Chen | H04N 9/7921 386/328 |

(Continued)

OTHER PUBLICATIONS

International Search Report and Written Opinion issued in Application No. PCT/EP2015/080274 dated Aug. 11, 2016, 14 pages.

*Primary Examiner* — Alexander Q Huerta
(74) *Attorney, Agent, or Firm* — Rothwell, Figg, Ernst & Manbeck, P.C.

(57) ABSTRACT

A method in an encoder, the method comprising: receiving a video; encoding a segment of the video at different bit rates to generate multiple representations of the segment at different bit rates; generating a quality metric for each representation of the video segment; and storing the lowest bit rate representation of the video segment for which the respective quality metric meets a predefined minimum quality threshold.

23 Claims, 7 Drawing Sheets

(56) References Cited

U.S. PATENT DOCUMENTS

| | | | |
|---|---|---|---|
| 2004/0098463 A1* | 5/2004 | Shen | G06F 17/30902 709/213 |
| 2006/0133775 A1* | 6/2006 | Ju | H04N 5/76 386/295 |
| 2013/0298170 A1* | 11/2013 | Elarabawy | H04W 28/0231 725/62 |
| 2014/0156863 A1* | 6/2014 | Gao | H04L 65/4084 709/231 |
| 2014/0237525 A1* | 8/2014 | Rothschild | H04N 21/236 725/92 |
| 2014/0247887 A1* | 9/2014 | Brueck | H04N 19/40 375/240.26 |
| 2014/0282787 A1* | 9/2014 | Wirick | H04N 19/40 725/115 |
| 2015/0023404 A1* | 1/2015 | Li | H04L 65/4084 375/240.02 |
| 2015/0089554 A1* | 3/2015 | Phillips | H04N 21/26258 725/92 |
| 2015/0100994 A1* | 4/2015 | Phillips | H04N 21/2393 725/93 |
| 2016/0100162 A1* | 4/2016 | Reisner | H04N 19/115 375/240.02 |
| 2016/0337680 A1* | 11/2016 | Kalagi | H04N 21/2662 |
| 2017/0171610 A1* | 6/2017 | Nair | H04N 21/2362 |
| 2017/0302981 A1* | 10/2017 | Sethuraman | H04N 21/234354 |
| 2018/0242015 A1* | 8/2018 | Katsavounidis | H04N 21/234363 |

\* cited by examiner

CLOUD DVR STORAGE

CROSS REFERENCE TO RELATED APPLICATION(S)

This application is a 35 U.S.C. § 371 National Stage of International Patent Application No. PCT/EP2015/080274, filed Dec. 17, 2015, designating the United States and claiming priority to U.S. provisional application No. 62/214,559, filed on Sep. 4, 2015. The above identified applications are incorporated by this reference.

TECHNICAL FIELD

The present application relates to a method in an encoder, an encoder, a method in a network recoding apparatus, a network recording apparatus, a computer-readable medium, and a network apparatus.

BACKGROUND

A television service operator delivers television services to its subscribers. The service operator provides a set top box to the subscriber in order to decode a transmitted signal and output this to, for example, a television. The functionality provided by set top boxes has improved in recent decades, and now certain functionality such as recording, multiple tuners, and access to on-demand content may be provided by the set top box.

A set top box with recording functionality may be called a digital video recorder (DVR). Television service transmission is typically digital, which is more efficient than analog transmission, and hence the received video is in a digital format lending itself well to digital video recording. A DVR may sometimes be referred to as a personal video recorder (PVR), but in this document DVR will be used. A DVR records video in a digital format to a disk drive, USB flash drive, SD memory card, SSD or other local mass storage device.

The television service operator must provide a set top box to every subscriber. This hardware represents a significant expense. Further, any maintenance cost incurred by this fleet of set top boxes is typically covered by the service provider. As such, a small reduction in the cost and complexity of a set top box can have a significant benefit to the service operator. To this end, some service operators have removed any mass storage capability from their set top boxes. Instead, DVR functionality is provided by a network DVR (also known as cloud DVR) system. In a network DVR, recorded content is not stored locally but at a server on the operator's network (in the cloud). When the user wishes to watch the recorded content it is streamed from the server to the user device over an internet connection.

An important technology for delivering video over an internet connection is adaptive bit rate (ABR) streaming. This technology allows for a variation in bandwidth which is typical for a home internet connection. This variation may be due to local contention with other devices and users in the home using the same modem connection for other purposes. A further cause for the variation in available bandwidth is local loop contention where the bandwidth between a plurality of modems in a neighborhood must be shared between a respective plurality of homes.

ABR streaming allows for a variation in bandwidth by measuring the available bandwidth between a streaming device and a server that is sending the streamed video, and providing the video stream at a bit rate that maximizes the use of the available bandwidth. To achieve this, a server that uses ABR will make the streamed video available at a plurality of different bit rates. The ABR streaming client in the streaming device then selects the appropriate bit rate version. The set of bit rates is normally fixed.

A network DVR system which delivers content using ABR streaming must store large volumes of video data, with multiple representations (at different bit rates) for each segment of content.

Just-in-time transcode (JITX) is a known technique which reduces the amount of storage required for a network DVR system. This is achieved by only storing the highest bit rate representation of the ABR content, and then deriving from this representation a lower bit rate representation by transcoding only when that representation is requested by a client.

SUMMARY

Current JITX implementations store the highest bit rate representation in order to be able to derive all the other representations. This is wasteful because it does not take into account the variability in how complex video content is. That is, because simple content can be described at a sufficient quality using a bit rate that is lower than the highest available bit rate, the amount of storage space can be reduced by storing a representation having a lower bit rate. This will not affect the performance of the system provided that the quality of the different bit rate representations is accurately determined and appropriately selected.

By determining a measure of quality of each representation, it is possible for the network DVR to elect to store, segment by segment a lower bit rate representation when the desired quality can be achieved at that lower bit rate.

It should be noted that traditional JITX systems must transcode all but the highest bit rate representations. According to the presently described system, where a particular segment is encoded at a sufficient quality that is less than the highest available bit rate, then when a higher bit rate representation is called for, the content can be delivered without transcoding, it can be delivered by padding the stored bit rate representation, or by delivering that lower bit rate stored representation instead. Transcoding is a processor intensive operation and so this provides an added benefit of reducing the work load at the streaming server.

Furthermore, the stored representation can be stored with the measure of quality. That measure of quality can be used to control the parameters of the JITX operation to balance the need for compression efficiency against compute resource.

Accordingly, there is provided a method in an encoder, the method comprising: receiving a video; and encoding a segment of the video at different bit rates to generate multiple representations of the segment at different bit rates. The method further comprises generating a quality metric for each representation of the video segment; and storing the lowest bit rate representation of the video segment for which the respective quality metric meets a predefined minimum quality threshold.

The method may be performed in a network apparatus comprising an encoder, the network apparatus having a network DVR function. The encoded bit rate of a video segment has an effect on the quality of the video. However, there is some variation in the measured quality because some video scenes are better suited to encoding than others. For example, a simple scene such as a talking head in front of static background can be encoded at a high quality using a relatively low bitrate. As such, the measure of encoding quality may be substituted by an indication of complexity.

The quality metric may be generated by estimation. For example, the quality metric may be derived using a parametric method whereby the quality of a segment is determined based upon the transport stream, packet headers, motion vectors, and/or quantization parameters. Another example of an estimation method is by preprocessing the baseband video before encoding to determine spatial and/or temporal complexity of the content.

The predefined minimum quality threshold may be selected according to meta data associated with the video. Meta data associated with the video may be used to ascertain the type of content, such as a sporting event, a film, a serial drama, or a news program. The system operator may select a minimum quality threshold specific to each type of content.

The encoded video may be streamed to at least one client using adaptive bit rate streaming. The different bit rate representations of the video segment are used in the live adaptive bit rate streaming of the content. The quality metric for the stored representation of the video segment may be stored with the stored representation of the video segment.

The method may further comprise receiving a record instruction, the record instruction requesting that the video is recorded. The record instruction is sent from a user device, and instructs the encoder that the presently streamed video should be recorded for later playback by the user device.

The method may further comprise: receiving a playback instruction from the user device; and playing back the video segment using adaptive bit rate streaming, whereby one or more other bit rate representations of the video are generated from the stored lowest bit rate representation of the video segment for which the respective quality metric meets a predefined minimum quality threshold. The later playback to the user device is performed by using adaptive bit rate streaming to send the recorded video to the user device. Depending on the available bit rate for transmission to the user device, each stored segment is padded to have a higher bit rate, used as is, or transcoded to a lower bit rate.

There is further provided an encoder comprising an input, a processor and a storage component. The input is arranged to receive a video. The processor is arranged to encode a segment of the video at different bit rates to generate multiple representations of the segment at different bit rates. The processor is also arranged to generate a quality metric for each representation of the video segment. The storage component is arranged to store the lowest bit rate representation of the video segment for which the respective quality metric meets a predefined minimum quality threshold. The encoder may comprise part of a video distribution system.

There is further provided a method in a network recoding apparatus, the method comprising: receiving record instruction from a user device; and storing the lowest bit rate representation of a video segment for which the respective quality metric meets a predefined minimum quality threshold. The method further comprises receiving a playback instruction; and transmitting the video to the user device using adaptive bit rate streaming, wherein representations of the video at different bit rates are generated from the stored representation of the video segment. The network recording apparatus may comprise a part of a video distribution system.

The record instruction may comprise a request that a video is recorded, the video being streamed using adaptive bit rate streaming. The video segment that is stored may be a segment of the video.

A higher bit rate representation of the segment may be generated from the stored representation of the video segment by padding the representation of the stored video segment, or by delivering that lower bit rate stored representation instead. A lower bit rate representation of the segment may be generated from the stored representation of the video segment by transcoding The transcoding operation may be configured such that the processing requirements of the transcode operation are determined according to the quality metric of the stored representation of the video segment. The transcoding may be performed using selected transcode parameters. The transcode parameters may be selected such that the processing requirements of the transcode operation are determined according to the quality metric of the stored representation of the video segment.

The transcode parameters may be selected by comparing the stored quality metric of the stored video segment to an expected quality of the transcoded representations using different transcode parameters.

There is further provided a network recording apparatus comprising: an input, a storage component and an output. The input is arranged to receive a record instruction from a user device. The storage component is arranged to store the lowest bit rate representation of a video segment for which the respective quality metric meets a predefined minimum quality threshold. The input is further arranged to receive a playback instruction. The output is for transmitting the video to the user device using adaptive bit rate streaming, wherein representations of the video at different bit rates are generated from the stored representation of the video segment.

There is further provided a computer-readable medium, carrying instructions, which, when executed by computer logic, causes said computer logic to carry out any of the methods defined herein. There is further provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive or a RAM (Random-access memory).

There is further provided a network apparatus comprising a processor and memory, said memory containing instructions executable by said processor whereby said user terminal is operative to: receive a video; encode a segment of the video at different bit rates to generate multiple representations of the segment at different bit rates; generate a quality metric for each representation of the video segment; and store the lowest bit rate representation of the video segment for which the respective quality metric meets a predefined minimum quality threshold.

BRIEF DESCRIPTION OF THE DRAWINGS

An improved cloud DVR storage will now be described, by way of example only, with reference to the accompanying drawings, in which.

DETAILED DESCRIPTION

Figure 1:
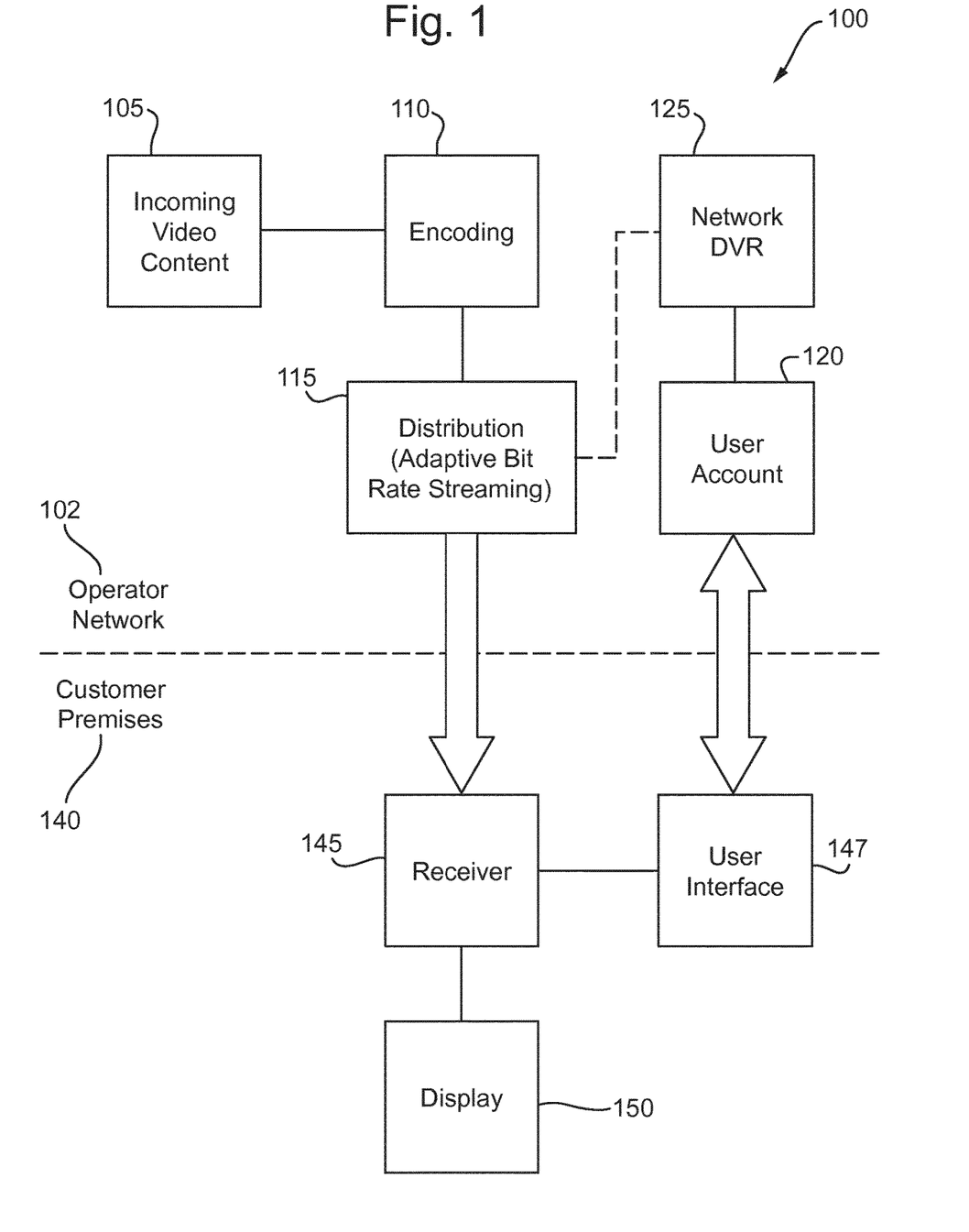
FIG. 1 shows a simplified television distribution system.

FIG. 1 illustrates a simplified television distribution system 100 comprising an operator network 102 and a customer premises 140. Incoming video content 105 is encoded 110 and distributed 115 over a packet network to the customer premises 140. At the customer premises 140 a receiver 145, typically a set top box, receives the distributed video, decodes it and outputs it to a display 150. The receiver 145 operates with a user interface 147, the user interface 147 communicates with a user account 120 in the operator network, the user account 120 associated with the respective customer premises 140. Through the user interface 147 and the user account 120, the user may record video content on a network DVR 125 in the operator network 102.

As explained above, some prior art network DVR system which deliver content using ABR streaming must store large volumes of video data, with multiple representations (at different bit rates) for each segment of content. Some improved prior art network DVR arrangements use just-in-time transcode (JITX) to reduce the amount of storage required for a network DVR system. This is achieved by only storing the highest bit rate representation of the ABR content, and then deriving from this representation a lower bit rate representation by transcoding.

The present application describes an improved network DVR system which reduces both the amount of data that must be stored and the amount of transcoding that must be performed without a measurable impact on the quality of video delivered to the customer premises.

Current JITX implementations store the highest bit rate representation in order to be able to derive all the other representations. This is wasteful because it does not take into account the variability of content complexity. That is, because simple content can be described at a sufficient quality using a bit rate that is lower than the highest available bit rate, the amount of storage space can be reduced by storing a representation having a lower bit rate. This will not affect the performance of the system provided that the quality of the different bit rate representations is accurately determined and appropriately selected. This reduces the amount of data that must be stored. Additionally, when a higher bit rate representation than the stored bit rate representation is requested, this is generated using padding instead of transcoding. Accordingly, the described arrangement reduces the amount of transcoding that must be performed to deliver the stored content using adaptive bit rate streaming.

Figure 2:
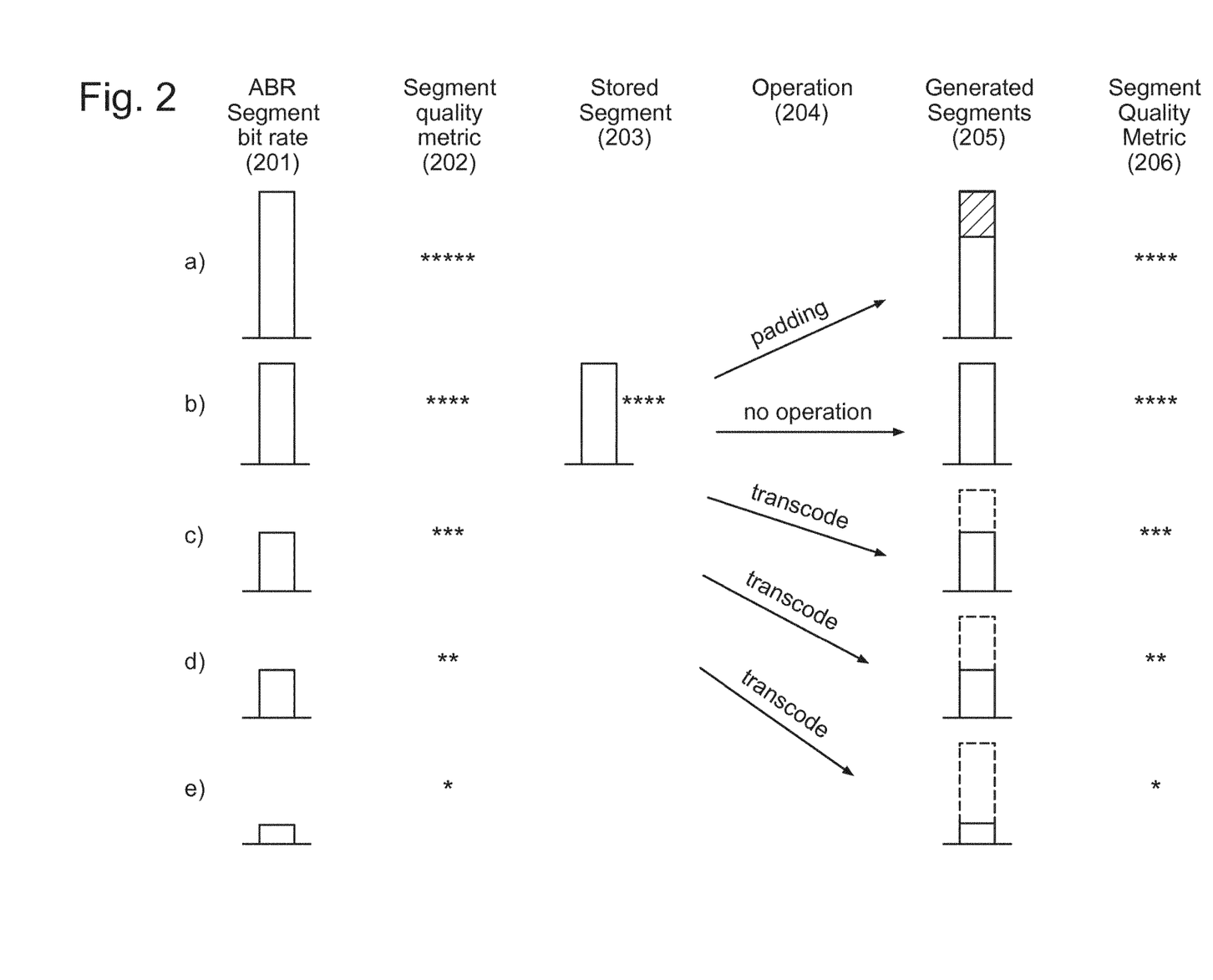
FIG. 2 shows a first example of the presently described system in operation.

FIG. 2 illustrates a first example of the presently described system in operation. Live content is streamed with segments available at 5 different bit rates (201a, 201b, 201c, 201d, and 201e). A segment quality metric 202 is measured for each segment, and here these are determined to be 5-star, 4-star, 3-star, 2-star, and 1 star for respective ABR segments 201a, 201b, 201c, 201d, and 201e. In this example, the predetermined minimum quality threshold is 4-star. The ABR segment having the lowest bit rate that meets this minimum quality threshold is 201b. This is chosen and stored as the stored segment 203 in the network DVR.

At a later time, the stored segment is selected and retrieved for playback. The segment is made available for streaming at the same five bit rate levels as it was originally streamed. Where a higher bit rate segment 205a is requested, the stored segment 203 is padded 204a to have the desired higher bitrate. Where the same bit rate segment 205b is requested, no operation 204b is required and the stored segment 203 is simply transmitted to the customer premises. Where a lower bitrate segment 205c, 205d, 205e is required, the stored segment 203 is transcoded 204c, 204d, 204e to have the desired bit rate.

It is apparent from FIG. 2 that this improved network DVR system reduces the amount of data that must be stored, because stored segment 203 is smaller than the highest available bit rate segment 201a. Further, this improved system reduces the amount of transcoding that must be performed because when a higher bit rate segment is requested during playback, this is generated using padding which is a much simpler computational operation than transcoding. Further it is apparent that the quality reduction in streamed content is minimal with only the highest available bit rate quality being reduced from 5-star to 4-star.

Figure 3:
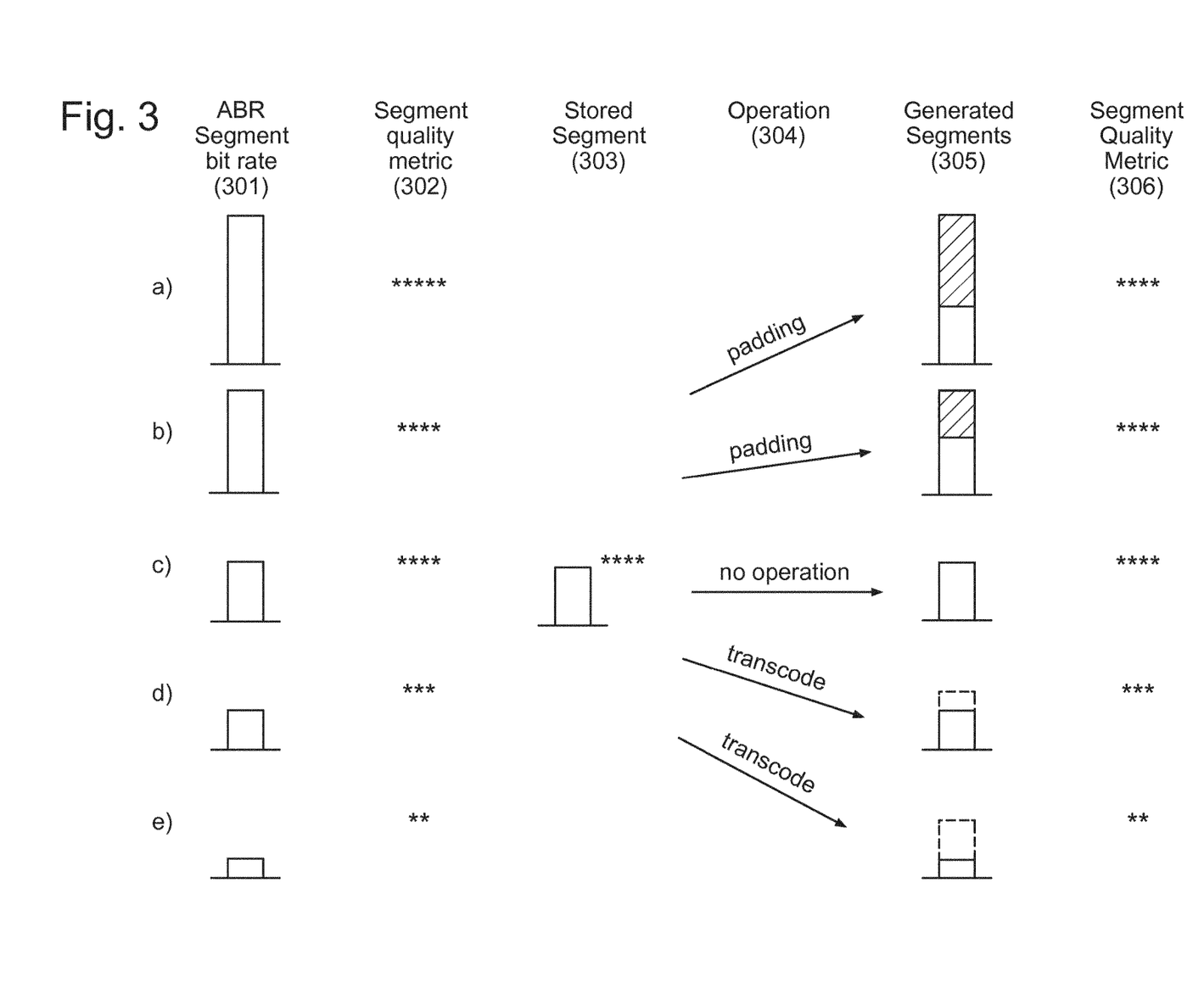
FIG. 3 shows a second example of the presently described system in operation.

FIG. 3 illustrates a second example of the presently described system in operation. Live content different to that of FIG. 2 is streamed with segments available at the same five different bit rates 301a, 301b, 301c, 301d, and 301e. A segment quality metric 302 is measured for each segment, and here these are determined to be 5-star, 4-star, 4-star, 2-star, and 1 star for respective ABR segments 301a, 301b, 301c, 301d, and 301e. In this example, the predetermined minimum quality threshold is 4-star. The ABR segment having the lowest bit rate that meets this minimum quality threshold is now 301c. This is chosen and stored as the stored segment 303 in the network DVR.

At a later time, the stored segment 303 is selected and retrieved for playback. The segment is made available for streaming at the same five bit rate levels as it was originally streamed. Where a higher bit rate segment 305a or 305b is requested, the stored segment 303 is padded 304a or 304b, respectively to have the desired higher bitrate. Where the same bit rate segment 305c is requested, no operation 304c is required and the stored segment 303 is simply transmitted to the customer premises. Where a lower bitrate segment 305d, 305e is request, the stored segment 303 is transcoded 304d, 304e to have the desired bit rate.

It is apparent from FIG. 3 that this improved network DVR system reduces the amount of data that must be stored, because stored segment 303 is smaller than the highest available bit rate segment 301a. Further, this improved system reduces the amount of transcoding that must be performed because when a higher bit rate segment is requested during playback, this is generated using padding which is a much simpler computational operation than transcoding. Further it is apparent that the quality reduction in streamed content is minimal with only the highest available bit rate quality being reduced from 5-star to 4-star.

Figure 4:
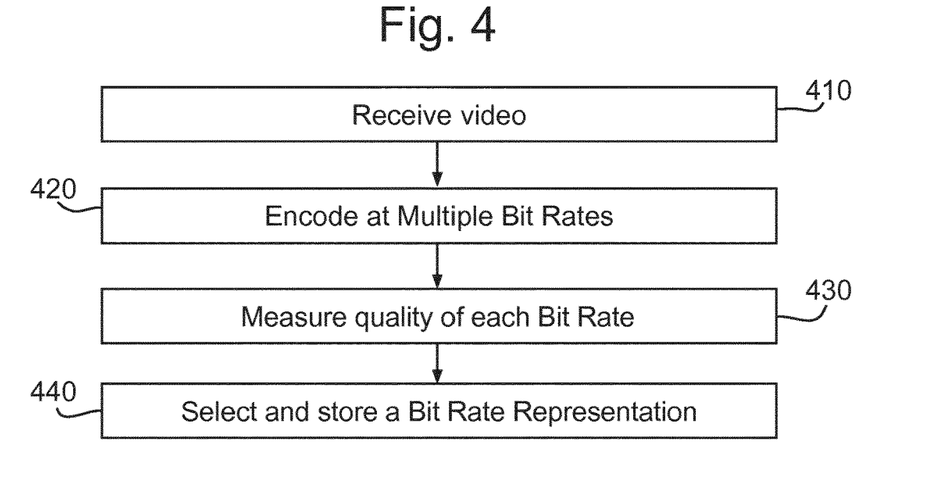
FIG. 4 shows a method according to the presently described system.

FIG. 4 illustrates a method according to the presently described system. The method is performed in an encoder and comprises receiving 410 a video; encoding 420 a segment of the video at different bit rates to generate multiple representations of the segment at different bit rates. The method further comprises generating 430 a quality metric for each representation of the video segment; and storing 440 the lowest bit rate representation of the video segment for which the respective quality metric meets a predefined minimum quality threshold.

The encoded bit rate of a video segment has an effect on the average quality of the video. However, there is variation within the video that results in some video scenes being better suited to encoding than others. For example, a fast moving action scene will require a high bit rate to be encoded at a high quality level. Numerous algorithmic quality measures are available which can assess either encoded or decoded video streams to assess the quality of the content.

The predefined minimum quality threshold may be selected according to meta data associated with the video. Meta data associated with the video may be used to ascertain the type of content, such as a sporting event, a film, a serial drama, or a news program. The system operator may select a minimum quality threshold specific to each type of content.

The ABR segments at different bit rates are used to live stream the video to any customers that are watching the live video stream. Typically, multiple customers will be watching the live stream, with each one of the available different bit rate versions of the segment being received by at least one customer at any one time.

In an alternative embodiment the measured quality metric for the stored representation of the video segment is stored with the stored representation of the video segment. Upon playback, when the stored video segment is retrieved and it is determined the segment must be transcoded to a lower bitrate, the quality metric is retrieved at the same time, and used to determine how the segment should be transcoded. This is done by using the quality metric to control the parameters of the transcode operation. This allows the system to balance the need for compression efficiency against compute resource.

Transcoding can be performed at different levels of complexity, where a simple transcode operation uses limited processing resources, and where a complex transcode operation requires a large amount of processing resources. Using the quality metric to determine how the segment should be transcoded comprises determining how much processing effort is applied in the transcoding. For example, if the retrieved segment has a quality metric that is very close to the minimum quality threshold, then a more complex transcode operation is applied to ensure a minimal drop in quality for the lower bit rate version. Conversely, if the retrieved segment has a quality metric that is much greater than the minimum quality threshold, then a greater quality loss in the transcode is acceptable and a simpler transcode operation is applied, conserving compute resource. A measure of the video complexity may be used in place of the quality metric.

Figure 5:
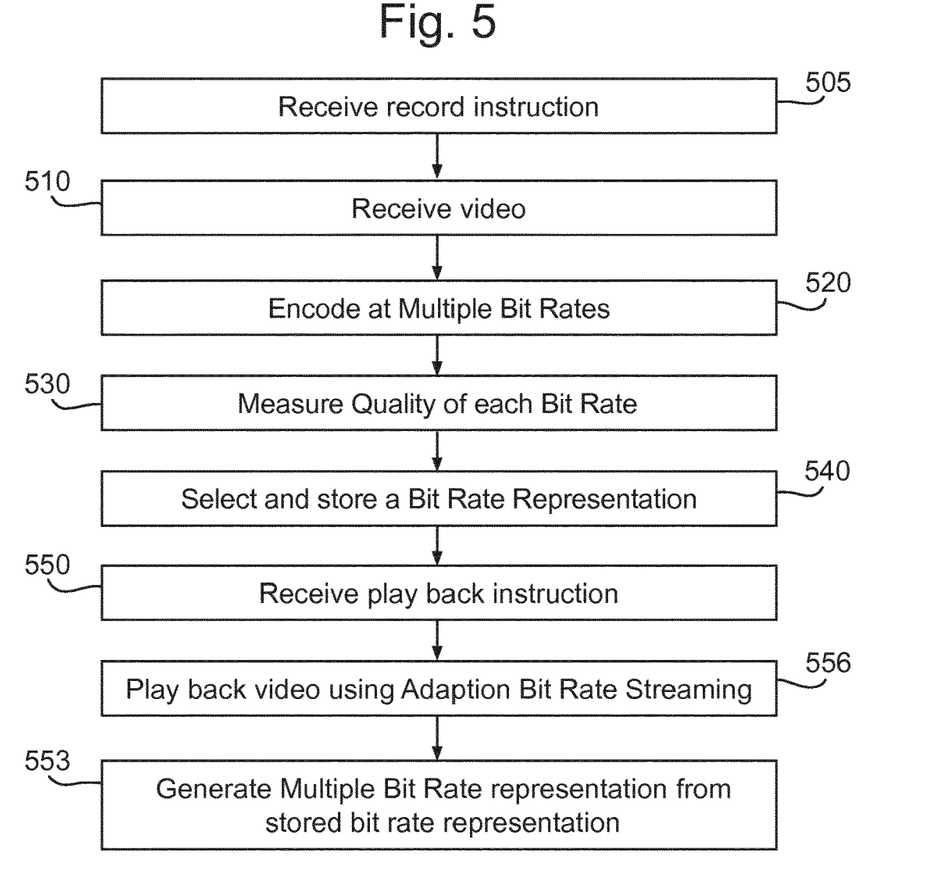
FIG. 5 shows another method according to the presently described system.

FIG. 5 illustrates another method according to the presently described system. The method comprises receiving 505 a record instruction, the record instruction requesting that a particular video is recorded. The record instruction is sent from a user device, and instructs the encoder that the presently streamed video should be recorded for later playback by the user device. The method further comprises receiving 510 a video; and encoding 520 a segment of the video at different bit rates to generate multiple representations of the segment at different bit rates. The method further comprises generating 530 a quality metric for each representation of the video segment; and storing 540 the lowest bit rate representation of the video segment for which the respective quality metric meets a predefined minimum quality threshold.

In adaptive bit rate streaming a video comprises a plurality of segments, which when played back in order, recreate the original video content. When a record instruction is received, the process described herein is performed on all video segments that the selected video comprises.

The method illustrated in FIG. 5 further comprises receiving 550 a playback instruction from a user device, the user device associated with the same user account as instructed the recording of the video. In response to the playback instruction, the encoder retrieves the relevant stored video segments from a storage component and begins playback 556 of the video using adaptive bit rate streaming. To facilitate adaptive bit rate streaming, each stored segment is padded to have a higher bit rate, used as is, or transcoded to a lower bit rate 553 depending upon the bit rate demands of the streaming client. That is, during playback 556 of the video segment using adaptive bit rate streaming, one or more alternative bit rate representations of the video are generated 553 from the stored lowest bit rate representation of the video segment for which the respective quality metric meets a predefined minimum quality threshold.

Figure 6:
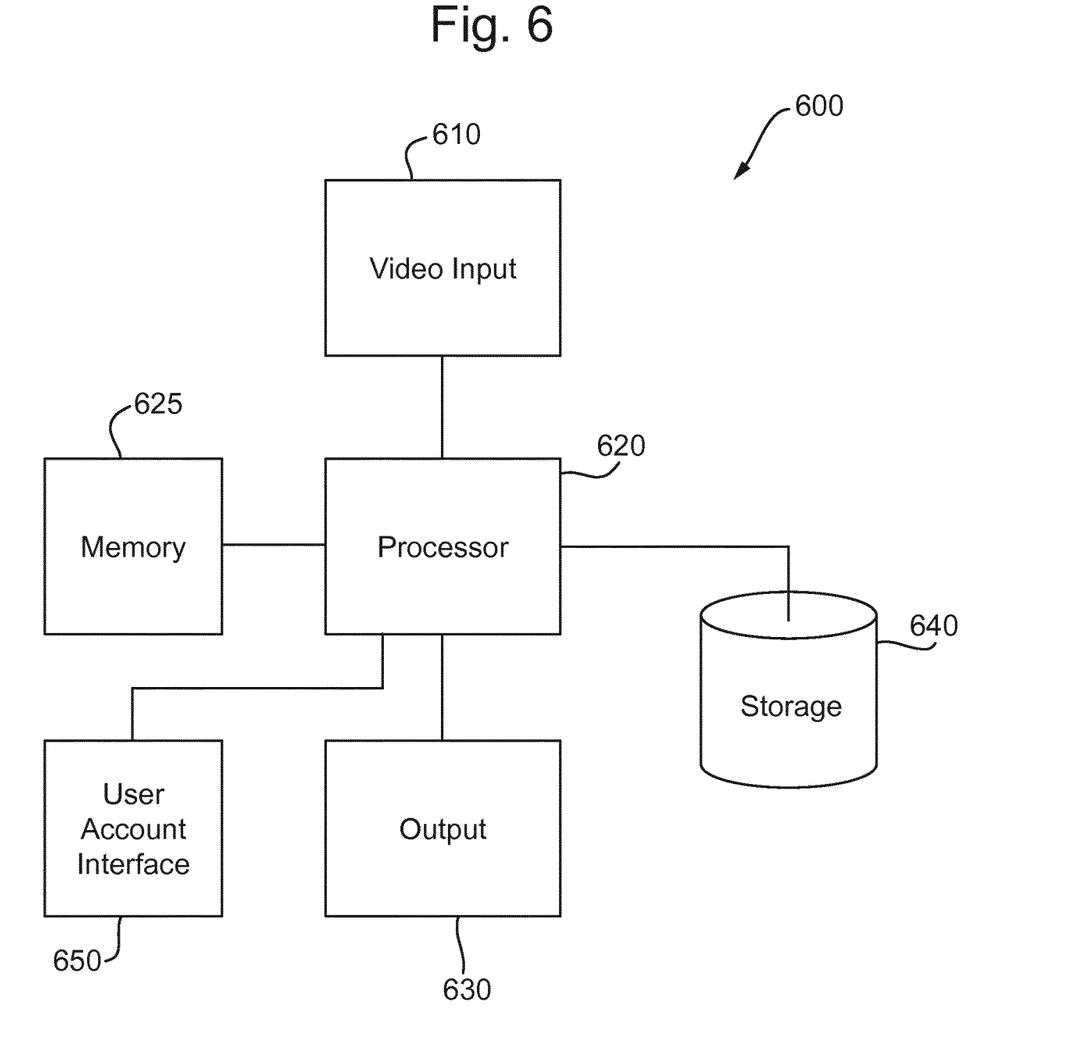
FIG. 6 shows an encoder.

FIG. 6 illustrates an encoder 600 comprising a video input 610, a processor 620, a memory 625, an output 630, storage component 640, and a user account interface 650. The video input 610 is arranged to receive a video for encoding. The processor 620 is arranged to encode a segment of the video at different bit rates to generate multiple representations of the segment at different bit rates. The processor 620 is also arranged to generate a quality metric for each representation of the video segment. The storage component 640 is arranged to store the lowest bit rate representation of the video segment for which the respective quality metric meets a predefined minimum quality threshold. The encoder may comprise part of a video distribution system.

The encoder 600 has a user account interface 650, which is arranged to receive instructions from a user equipment over the operators network. The encoder 600 receives a record instruction from a user device through the user account interface 650. The record instruction requests that a video that is streamed using adaptive bit rate streaming is recorded. This request is fulfilled by a network DVR. In response to the record request the encoder 600 stores the lowest bit rate representation of a video segment for which the respective quality metric meets a predefined minimum quality threshold in a storage component 640.

Subsequent to recording a video, the encoder 600 receives a playback instruction from the user equipment over the operator's network. In response to the playback instruction, the encoder 600 begins transmitting the recorded video to the user device using adaptive bit rate streaming, wherein representations of the video at different bit rates are generated from the stored representation of the video segment, wherein the video segment is a segment of the recorded video.

Further, the processor 620 is arranged to receive instructions which, when executed, causes the processor 620 to carry out the above described method. The instructions may be stored on the memory 625.

During delivery of the recorded video a higher bit rate representation of the segment is generated from the stored representation of the video segment by padding the representation of the stored video segment. Alternatively, when a higher bit rate representation is required, the stored bit rate representation is sent in its place, without padding. A lower bit rate representation of the segment is generated from the stored representation of the video segment by just in time transcoding.

The transcoding operation is configured such that the processing requirements of the transcode operation are determined according to the quality metric of the stored representation of the video segment. For example, if the retrieved segment has a quality metric that is very close to the minimum quality threshold, then the transcoding operation is configured to use more processing power. This ensures a minimal drop in quality for the resulting lower bit rate version. Conversely, if the retrieved segment has a quality metric that is much greater than the minimum quality threshold, then the transcode operation is configured to use less processing power. This will lead to a greater quality loss in the resulting lower bit rate version, but that will still yield a lower bit rate version of the segment having acceptable quality, while conserving processing resources.

The transcoding operation may be configured by modifying transcode parameters. The transcode parameters are selected such that the processing requirements of the transcode operation are determined according to the quality metric of the stored representation of the video segment. In an alternative embodiment, the transcode parameters are selected by comparing the stored quality metric of the stored video segment to an expected quality of the transcoded representations using different transcode parameters.

Figure 7:
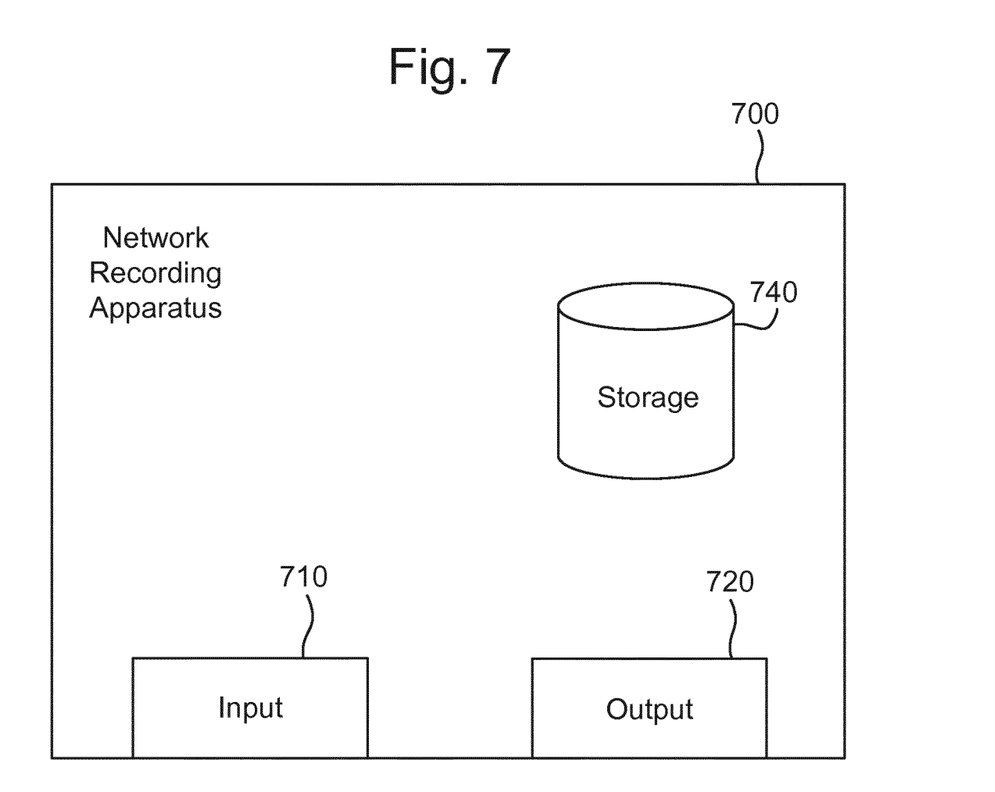
FIG. 7 shows a network recording apparatus.

FIG. 7 illustrates a network recording apparatus 700 comprising an input 710, a storage component 740 and an output 720. The input 710 is arranged to receive a record instruction from a user device. The storage component 740 is arranged to store the lowest bit rate representation of a video segment for which the respective quality metric meets a predefined minimum quality threshold. The input 710 is further arranged to receive a playback instruction. The output 720 is arranged to transmit the video to the user device using adaptive bit rate streaming, wherein representations of the video at different bit rates are generated from the stored representation of the video segment.

Figure 8:
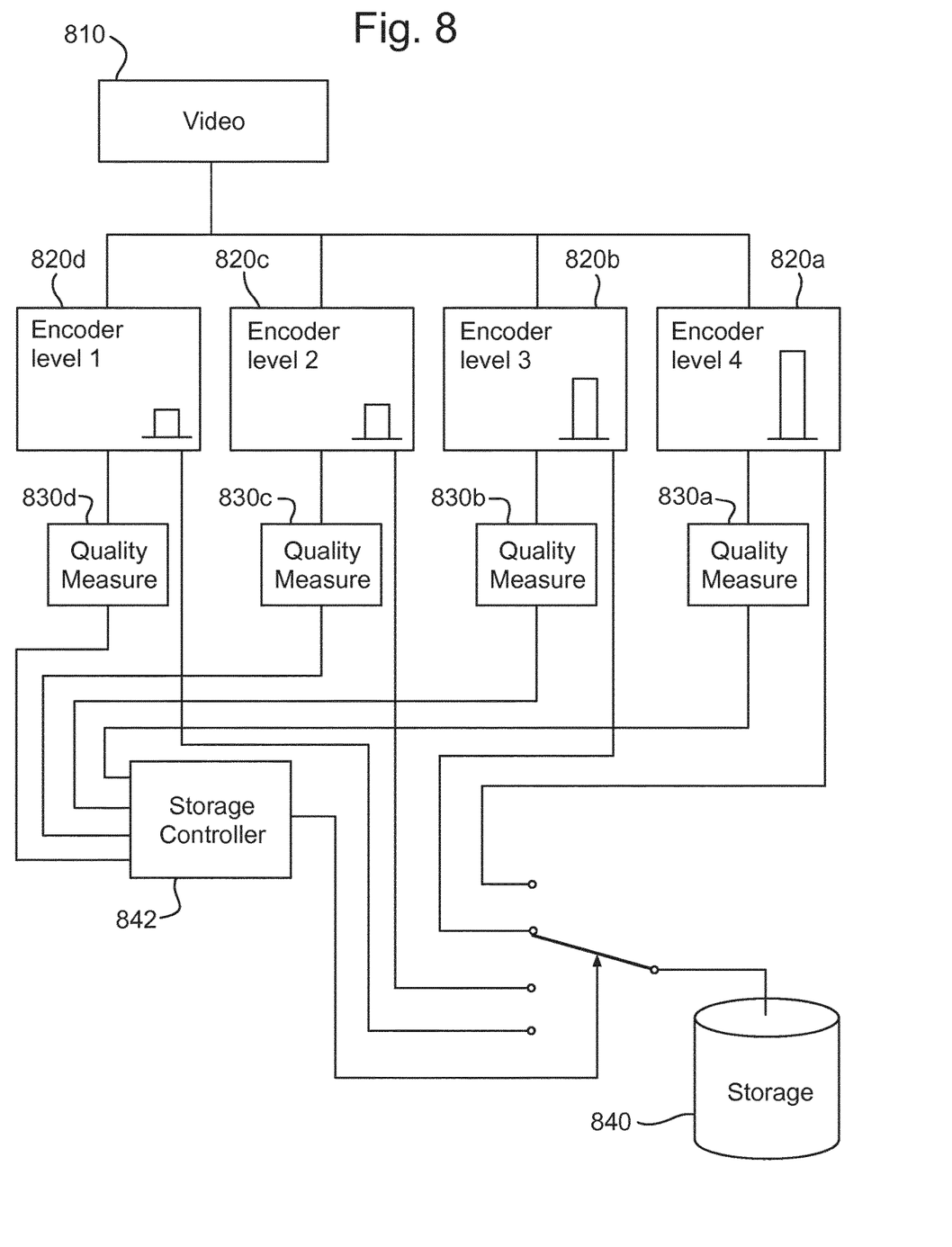
FIG. 8 shows the basic operation of a network storage function provided within an ABR streaming system.

FIG. 8 illustrates the basic operation of a network storage function provided within an ABR streaming system. This example illustrates just one channel of video being received at 810, in practice this arrangement would be operated in parallel for all channels for which the service operator wishes to provide a network DVR function to their customers.

To facilitate live ABR streaming of the incoming video content 810, the ABR streaming system segments the video and then encodes each segment at different bit rates. A plurality of encoders 820a, 820b, 820c, 820d, are provided, each arranged to generate encoded segments at different bitrates. Here, those bit rates are termed level 1, level 2, level 3, and level 4. For simplicity, 4 different bit rate versions are shown; in practice an ABR streaming service is likely to use many more. It is expected that multiple users will be consuming the live stream over a plurality of devices and connections, and as such it is expected that most, if not all, different bit rate versions will be distributed to at least one user device. The output of these encoded segments to the consumers of the live stream is not shown in FIG. 8.

To determine which bit rate version to store according to the method described herein, a quality measure is required for each bit rate version of an encoded video segment. This is illustrated in FIG. 8 by a quality measure function 830a, 830b, 830c, 830d for each respective encoder. A storage controller 842 receives these quality metrics and selects which bit rate version of the encoded video segment is stored in storage component 840. Note that the four terminal switch shown between the encoders and the storage component is purely illustrative.

The quality metric is an objective metric, and may comprise a full reference metric, a reduced reference metric, or a no-reference metric. These metrics are distinguished by the amount of information that is used.

Full Reference quality metrics compute the segment quality by comparing the original video signal against the encoded video segment. Typically, every pixel from the source is compared against the corresponding pixel at the encoded video segment, with no knowledge about the encoding process. Such full reference metrics are usually the most accurate at the expense of higher computational load.

Reduced Reference quality metrics extract some features of both the original video signal and the encoded video segment and perform a comparison to generate a quality score. This is less computationally intensive than a full reference quality metric.

No-Reference quality metrics try to assess the quality of an encoded video segment without any reference to the original video signal. Due to the absence of an original signal, they may be less accurate than full reference or reduced reference metrics, but are more efficient to compute.

The following are examples of No Reference quality metrics:

Pixel-Based metrics use a decoded representation of the encoded video segment.

This is analyzed and the resulting quality metric is based on the decoded pixel information.

Parametric metrics (also known as Bitstream metrics) make use of features extracted from the encoded video segment such as packet headers, motion vectors and quantization parameters. These metrics do not require access to the original video signal, nor do they require decoding of the encoded video segment, this can make them computationally efficient.

Hybrid metrics may use some parameters extracted from the bitstream together with some information from the decoded video signal.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope The above described method may be carried out by suitably adapted hardware, such as an adapted form of the exemplary hardware implementation of an encoder as shown in FIG. 6, or of a network recoding apparatus shown in FIG. 7. The method may also be embodied in a set of instructions, stored on a computer readable medium, which when loaded into a computer processor, Digital Signal Processor (DSP) or similar, causes the processor to carry out the hereinbefore described network DVR method.

One exemplary hardware embodiment is that of a Field Programmable Gate Array (FPGA) programmed to carry out the described method, located on a daughterboard of a rack mounted video encoder, for use in, for example, a television studio or satellite or cable TV head end.

Another exemplary hardware embodiment of the present invention is that of a video encoder comprising an Application Specific Integrated Circuit (ASIC).

The client device may be a user apparatus. The client device may be any kind of personal computer such as a television, a smart television, a set-top box, a games-console, a home-theatre personal computer, a tablet, a smartphone, a laptop, or even a desktop PC.

The method and apparatus described herein can be applied to any form of adaptive streaming. The principles disclosed herein can be applied to any streaming system which uses different video qualities, such as HTTP Adaptive Streaming, Apple™ HTTP Live Streaming, and Microsoft™ Smooth Streaming.

It will be apparent to the skilled person that the exact order and content of the actions carried out in the method described herein may be altered according to the requirements of a particular set of execution parameters, such as speed of encoding, accuracy of detection, resolution of video sources, type of compression standards in use with the statistical multiplexing method, and the like. Accordingly, the order in which actions are described and/or claimed is not to be construed as a strict limitation on order in which actions are to be performed.

The invention claimed is:

1. A method in an encoder, the method comprising:
   receiving a video;
   encoding a first segment of the video at different bit rates to generate at least two representations of the first segment of the video at different bit rates including a first bit rate representation of the first segment of the video and a second bit rate representation of the first segment of the video, wherein the first bit rate representation of the first segment of the video has a lower bit rate than the second bit rate representation of the first segment of the video;
   for each representation of the first video segment, generating a quality value indicating a quality of the representation of the first video segment; and
   storing the lowest bit rate representation of the first video segment for which the respective quality meets a predefined minimum quality threshold, wherein the step of storing the lowest bit rate representation of the first video segment for which the respective quality meets a predefined minimum quality threshold comprises:
   deciding whether or not to store the first bit rate representation of the first segment based on the generated quality value for the first bit rate representation of the first segment, wherein the step of deciding whether or not to store the first bit rate representation of the first segment comprises determining whether the generated quality value for the first bit rate representation of the first segment meets a predefined minimum quality value threshold; and
   if it is determined that the generated quality value for the first bit rate representation of the first segment meets the predefined minimum quality value threshold, then storing the first bit rate representation of the first video segment, otherwise refraining from storing the first bit rate representation of the first video segment and storing one of the other bit rate representations of the first segment.

2. The method of claim 1, wherein the predefined minimum quality threshold is selected according to meta data associated with the video.

3. The method of claim 1, wherein
   encoding the first segment of the video at different bit rates comprises:
   i) encoding the first segment of the video at a first bit rate, thereby generating the first bit rate representation of the first segment of the video; and
   ii) encoding the first segment of the video at a second bit rate that is higher than the first bit rate, thereby generating the second bit rate representation of the first segment of the video,
   generating a quality value for each representation of the first segment of the video comprises:
   i) generating a first quality value for the first bit rate representation of the first segment of the video; and
   ii) generating a second quality value for the second bit rate representation of the first segment of the video, and
   storing the lowest bit rate representation of the first segment of the video for which the respective quality meets a predefined minimum quality threshold comprises:
   i) comparing the first quality value for the first bit rate representation of the first segment of the video to the predefined minimum quality threshold to determine whether the first quality value for the first bit rate representation meets the predefined minimum quality threshold; and
   ii) as a result of determining that the first quality value for the first bit rate representation meets the predefined minimum quality threshold, discarding the second bit rate representation of the first segment of the video and storing the first bit rate representation of the first segment of the video.

4. The method of claim 3, further comprising:
   receiving a playback instruction from a user device; and
   playing the video in response to receiving the playback instruction, wherein
   playing the video comprises:
   using the first bit rate representation of the first segment of the video to generate a third bit rate representation of the first segment of the video, wherein the third bit rate representation of the first segment of the video has a higher bit rate than the first bit rate representation of the first segment of the video; and
   transmitting to the user device the third bit rate representation of the first segment of the video.

5. The method of claim 1, wherein the quality information for the stored representation of the first video segment is stored with the stored representation of the video segment.

6. The method of claim 1, further comprising receiving a record instruction, the record instruction requesting that the video be recorded.

7. The method of claim 1, further comprising
   encoding a second segment of the video at different bit rates; and
   generating quality information for each representation of the second segment of the video, wherein
   encoding the first segment of the video at different bit rates comprises encoding the first segment of the video at a first bit rate, thereby generating a first bit rate representation of the first segment of the video,
   encoding the second segment of the video at different bit rates comprises encoding the second segment of the video at the first bit rate, thereby generating a first bit rate representation of the second segment of the video,
   generating quality information for each representation of the first segment of the video comprises generating a first quality value for the first bit rate representation of the first segment of the video,
   generating quality information for each representation of the second segment of the video comprises generating a second quality value for the first bit rate representation of the second segment of the video, and
   the second quality value is different than the first quality value.

8. The method of claim 1, wherein
encoding the first segment of the video at different bit rates comprises encoding the first segment of the video at a first bit rate, thereby generating a first bit rate representation of the first segment of the video,
generating quality information for each representation of the first segment of the video comprises generating a first quality value for the first bit rate representation of the first segment of the video, and
generating a first quality value for the first bit rate representation of the first segment of the video comprises: comparing the first bit rate representation of the first segment of the video to the first segment of the video and generating the first quality value based on the comparison.

9. An encoder comprising:
an input arranged to receive a video;
a processor arranged to:
encode a first segment of the video at different bit rates to generate at least two representations of the first segment of the video at different bit rates including a first bit rate representation of the first segment of the video and a second bit rate representation of the first segment of the video, wherein the first bit rate representation of the first segment of the video has a lower bit rate than the second bit rate representation of the first segment of the video;
for each representation of the first video segment of the video, generate a quality value indicating a quality of the representation of the first video segment; and
store the lowest bit rate representation of the first video segment for which the respective quality meets a predefined minimum quality threshold, wherein the processor is arranged to store the lowest bit rate representation of the first video segment for which the respective quality meets a predefined minimum quality threshold by performing a process that includes:
deciding whether or not to store the first bit rate representation of the first segment based on the generated quality value for the first bit rate representation of the first segment, wherein deciding whether or not to store the first bit rate representation of the first segment comprises determining whether the quality value for the first bit rate representation of the first segment meets a predefined minimum quality value threshold; and
if it is determined that the quality value for the first bit rate representation of the first segment meets the predefined minimum quality value threshold, then storing the first bit rate representation of the first video segment, otherwise refraining from storing the first bit rate representation of the first video segment and storing one of the other bit rate representations of the first segment.

10. The encoder of claim 9, wherein
the apparatus is configured to encode the segment of the video at different bit rates by performing a process comprising:
  i) encoding the segment of the video at a first bit rate, thereby generating the first bit rate representation of the segment of the video; and
  ii) encoding the segment of the video at a second bit rate that is higher than the first bit rate, thereby generating the second bit rate representation of the segment of the video,
the apparatus is configured to generate a quality value for each representation of the first video segment of the video by performing a process comprising:
  i) generating a first quality value for the first bit rate representation of the segment of the video; and
  ii) generating a second quality value for the second bit rate representation of the segment of the video, and
the apparatus is configured to store the lowest bit rate representation of the segment of the video for which the respective quality value meets a predefined minimum quality threshold by performing a process comprising:
  i) comparing the first quality value for the first bit rate representation to the predefined minimum quality threshold to determine whether the first quality value for the first bit rate representation meets the predefined minimum quality threshold; and
  ii) as a result of determining that the first quality value for the first bit rate representation meets the predefined minimum quality threshold, discarding the second bit rate representation of the segment of the video and storing the first bit rate representation of the segment of the video.

11. A method in a network recoding apparatus, the method comprising:
receiving from a user device an instruction to record a video;
encoding a segment of the video at a first bit rate, thereby generating a first bit rate representation of the segment of the video;
generating a first quality value for the first bit rate representation of the segment of the video;
deciding whether or not to store the first bit rate representation of the segment of the video based on the generated first quality value for the first bit rate representation of the segment of the video by performing a process that includes comparing the generated first quality value for the first bit rate representation of the segment of the video to a predefined minimum quality value threshold to determine whether the generated first quality value for the first bit rate representation of the segment of the video meets the predefined minimum quality value threshold;
deciding to store the first bit rate representation of the segment of the video as a result of comparing the generated first quality value to the predefined minimum quality value threshold and determining that the generated first quality value meets the predefined minimum quality threshold;
storing the first bit rate representation of the segment of the video as a result of deciding to store the first bit rate representation of the segment of the video;
receiving a playback instruction; and
playing the video in response to receiving the playback instruction, wherein playing the video comprises:
using the first bit rate representation of the segment of the video to generate a second bit rate representation of the segment of the video; and
transmitting the second bit rate representation of the segment of the video.

12. The method of claim 11, wherein the video is streamed using adaptive bit rate streaming.

13. The method of claim 11, wherein the second bit rate representation of the segment of the video has a higher bit rate than the first bit rate representation of the segment of the video.

14. The method of claim 13, wherein using the first bit rate representation of the segment of the video to generate the second bit rate representation of the segment of the video comprises padding the first bit rate representation of the segment of the video, thereby generating the second bit rate representation of the segment of the video.

15. The method of claim 11, wherein
using the first bit rate representation of the segment of the video to generate the second bit rate representation of the segment of the video comprises transcoding the first bit rate representation of the segment of the video, and
the second bit rate representation of the segment of the video has a lower bit rate than the first bit rate representation of the segment of the video.

16. The method of claim 15, wherein processing requirements of the transcoding step are determined according to the generated first quality value.

17. The method of claim 15, wherein the transcoding is performed using selected transcode parameters.

18. The method of claim 17, wherein the transcode parameters are selected such that processing requirements of the transcode operation are determined according to the generated first quality value.

19. The method of claim 17, wherein the transcode parameters are selected by comparing the generated first quality value to an expected quality of transcoded representations using different transcode parameters.

20. The method of claim 11, further comprising:
encoding the segment of the video at second first bit rate, thereby generating a second bit rate representation of the segment of the video; and
as a result of determining that the first quality value for the first bit rate representation of the segment of the video meets the predefined minimum quality threshold, discarding the second bit rate representation of the segment of the video.

21. A network apparatus comprising:
a transmitter; and
processing circuitry coupled to the transmitter, wherein the apparatus is configured to:
process a first message transmitted by a user device, wherein the first message comprises an instruction to record a video;
encode a segment of the video at a first bit rate, thereby generating a first bit rate representation of the segment of the video;

generate a first quality value for the first bit rate representation of the segment of the video;

decide whether or not to store the first bit rate representation of the segment of the video based on the generated first quality value for the first bit rate representation of the segment of the video by performing a process that includes comparing the generated first quality value for the first bit rate representation of the segment of the video to a predefined minimum quality value threshold to determine whether the generated first quality value for the first bit rate representation of the segment of the video meets the predefined minimum quality value threshold;

decide to store the first bit rate representation of the segment of the video as a result of comparing the generated first quality value to the predefined minimum quality value threshold and determining that the generated first quality value meets the predefined minimum quality threshold;

store the first bit rate representation of the segment of the video as a result of deciding to store the first bit rate representation of the segment of the video; and play the video in response to receiving a playback instruction, wherein the apparatus is configured to play the vide by performing a process comprising:

using the first bit rate representation of the segment of the video to generate a second bit rate representation of the segment of the video; and employ the transmitter to transmit the second bit rate representation of the segment of the video.

22. A non-transitory computer-readable medium storing instructions, which, when executed by computer logic, causes said computer logic to carry out the method of claim 1.

23. A non-transitory computer-readable medium storing instructions, which, when executed by computer logic, causes said computer logic to carry out the method of claim 11.

* * * * *